United States Patent [19]
Haughton et al.

[11] Patent Number: 5,375,756
[45] Date of Patent: Dec. 27, 1994

[54] APPARATUS FOR ASSEMBLING AND WELDING FINAL END PLUGS TO NUCLEAR FUEL-CONTAINING CLADDING TUBES AND INSPECTING THE WELDS, ALL ON AN AUTOMATED BASIS

[75] Inventors: Robert A. Haughton; James D. Landry; Ralph J. Reda; Robert J. Sziemkiewicz, all of Wilmington, N.C.

[73] Assignee: General Electric Company, San Jose, Calif.

[21] Appl. No.: 40,974

[22] Filed: Mar. 31, 1993

[51] Int. Cl.⁵ .......................... B23K 9/02; B23K 37/00
[52] U.S. Cl. ............................................ 228/10; 228/9; 228/42; 228/60; 29/723
[58] Field of Search .................. 29/723; 228/60, 9, 10, 228/42, 47.1

[56] References Cited

U.S. PATENT DOCUMENTS

| | | | |
|---|---|---|---|
| 4,511,075 | 4/1985 | Yeo | 228/10 |
| 4,660,270 | 4/1987 | Rieben | 29/723 |
| 4,857,260 | 8/1989 | Schoening, Jr. et al. | 29/723 |
| 4,919,884 | 4/1990 | Chotard | 29/723 |

FOREIGN PATENT DOCUMENTS 64-31096  2/1989  Japan .................................. 29/723

*Primary Examiner*—P. Austin Bradley
*Assistant Examiner*—Jeffrey T. Knapp
*Attorney, Agent, or Firm*—J. E. McGinness

[57] ABSTRACT

In an automated final weld apparatus, a transporter conveys nuclear fuel-loaded cladding tubes successively to a check station to verify the presence of a plenum spring in the open end of each cladding tube, a reader station where a unique first end plug serial number is read, an evacuation/backfill station where the cladding tube is backfilled with helium, a seam welding station where a final end plug is welded to the cladding tube open end, and a seal weld station where the tube is pressurized with helium through a pressurization hole in the final end plug, whereupon the pressurization hole is welded closed. After checking for helium leakage, the seam weld is inspected in a succession of inspection stations, and, depending on inspection results, the finished nuclear fuel rods are sorted into accepted and rejected lots.

17 Claims, 4 Drawing Sheets

APPARATUS FOR ASSEMBLING AND WELDING FINAL END PLUGS TO NUCLEAR FUEL-CONTAINING CLADDING TUBES AND INSPECTING THE WELDS, ALL ON AN AUTOMATED BASIS

BACKGROUND OF THE INVENTION

1. Field of the Invention

The present invention relates to automated apparatus for expediting the handling, processing and quality inspection procedures involved in the manufacture of nuclear fuel rods.

2. Description of the Prior Art

A nuclear fuel rod is comprised of a column of fuel pellets sealed in an elongated cladding tube typically formed of a zirconium alloy. In the process of manufacturing nuclear fuel rods, the last major operation prior to loading the tubes with fuel pellets is to seal off one of their open ends by welding an end plug thereto in a first weld operation.

Commonly assigned Schoenig, Jr. et al., U.S. Pat. No. 4,857,260, issued Aug. 15, 1989, is directed to automated apparatus for assembling and welding first end plugs to cladding tubes and then quality inspecting each weld. As disclosed therein, empty cladding tubes are placed on an input queue from which they are picked up one-by-one by a tube transporter for a stepwise indexing movement in a direction transverse to their axes into axial alignment with a succession of operating stations. At each operating station, the transporter pauses while the tubes are concurrently, axially translated into the operating stations. The first in the succession of operating stations is a welding station where a first end plug is welded to a tube open end. The next station is a cooldown station where each first end plug weld is rapidly cooled. Next, a unique serial number imprinted on the first end plug is read in a reader station. Then, the first end plug weld is inspected for integrity in an ultrasonic inspection station. In a second inspection station, the weld diameter and end plug concentricity with the cladding tube are gauged for acceptability. Then, in a last inspection station, the characteristics of any interior zirconium liner are determined.

The data obtained from these various inspection stations are gathered by data acquisition means, collated on the basis of each end plug serial number, and compared against predetermined quality control standards to determine whether the first end plug welds are acceptable or rejectable. As a result of this determination, the tubes, upon arriving at a final, sorting station, are automatically segregated into accepted and rejected lots. The accepted tubes are then conveyed to automated apparatus operating to load fuel pellets into the cladding tubes through their open ends opposite from the first end plug. It then remains to weld a final end plug to the loading end of each cladding tube in a final weld operation.

Since the final end plug weld involves essentially the same welding and inspection operations as does the first end plug weld, it would be advantageous to automate the final end plug weld in the same manner. However there are several operations necessary in the final end plug weld that are not performed in the first end plug weld. One of these distinctive operations is the inclusion of a plenum spring in a plenum section of each cladding tube. The plenum spring is a high spring constant compression spring that acts between the final end plug and the column of fuel pellets in the cladding tube to maintain the pellets in interfacial contact. For many fuel rod designs, the plenum spring is combined in a retainer with a tube holding a getter material. It is critical that every fuel rod contain a plenum spring.

Another distinctive operation is to backfill the cladding tubes with from three to twenty atmospheres of an inert gas, such as helium, prior to sealing off the tube interior with the final end plug weld. This means that at least a sealing weld to finally close off the tube interior must be performed under high pressure. To avoid having to perform a high pressure girth or seam weld affixing the final end plug to the cladding tube open end, the final end plugs are provided with a small pressurization hole. Thus, the girth weld can be performed in an inert atmosphere at normal pressure, i.e., one atmosphere. Then in a subsequent operation, the final end plug end of the cladding tube is inserted into a separate weld box which is then sealed and flooded with helium to the requisite tube backfill pressure. Helium thus enters the tube interior through the final end plug pressurization hole. When pressure equalization between the tube interior and the welding chamber is achieved, the pressurization hole is welded closed. A final end plug weld should then be checked to ensure that helium is not leaking through the girth weld or the pressurization hole seal weld.

When a final end plug welding and inspection apparatus is automated in the manner disclosed in the above noted U.S. Pat. No. 4,857,260, the times that the cladding tubes spend at each operating station are of an equal duration since the cladding tubes are indexed by a common transporter. The length of this equal duration is determined by the station that takes the longest time to complete its operation. Thus, throughput of the apparatus can be improved if the duration at each station is reduced by balancing out the functions performed at the various stations. Manufacturing economies can then be achieved, even at the expense of increasing the number of operating stations.

SUMMARY OF THE INVENTION

It is accordingly an objective of the present invention to provide automated apparatus for welding and inspecting final end plug welds on an expedited, high throughput basis. To this end, the apparatus of the present invention includes an inclined input queue for accumulating a plurality of cladding tubes containing a full load of nuclear fuel pellets. While waiting in the input queue, a plenum spring or a retainer, comprising a plenum spring and getter, is inserted into the open end of each cladding tube. The tubes roll en masse to the lower end of the input queue where they are successively picked off by a tube transporter for stepwise conveyance to a plurality of stations including, in succession, a check station operating to verify that a plenum spring or retainer has been inserted in each tube, a reader station operating to read a serial number imprinted on a first end plug closing off the other end of each tube, a low pressure backfill station where each tube is evacuated and then backfilled with an inert gas, and a low pressure welding station where a final end plug is welded to the open end of each tube. Each cladding tube is then indexed to a high pressure welding station where each tube is pressurized with an inert gas through a small pressurization hole in the final end plug, and the pressurization hole is welded shut. Next the end plug welds are checked for loss of pressurization in a station having an inert gas detector.

The end plug welds are then inspected at a pair gauging stations to determine if the united end plug and cladding tube are in concentric relation, if weld diameter is acceptable, and if the end plug is of the type specified for the fuel rod design being produced. In a final inspection station, the final end plug welds are ultrasonically scanned for integrity.

Data obtained at these various inspection stations are gathered by data acquisition means, collated on the basis of end plug serial numbers, and compared against predetermined quality control standards to determine whether the final end plug welds are acceptable or rejectable. As a result of this determination, the cladding tubes are automatically sorted into accepted and rejected lots.

Additional objectives and advantages of the invention will be set forth in part in the description which follows, and in part will be obvious from the description, or may be learned by practice of the invention. The objectives and advantages of the invention will be realized and obtained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate a preferred embodiment of the invention and together with the description, serve to explain the principles of the invention.

Corresponding reference numerals refer to like parts throughout the several views of the drawings.

DETAILED DESCRIPTION

Figure 1:
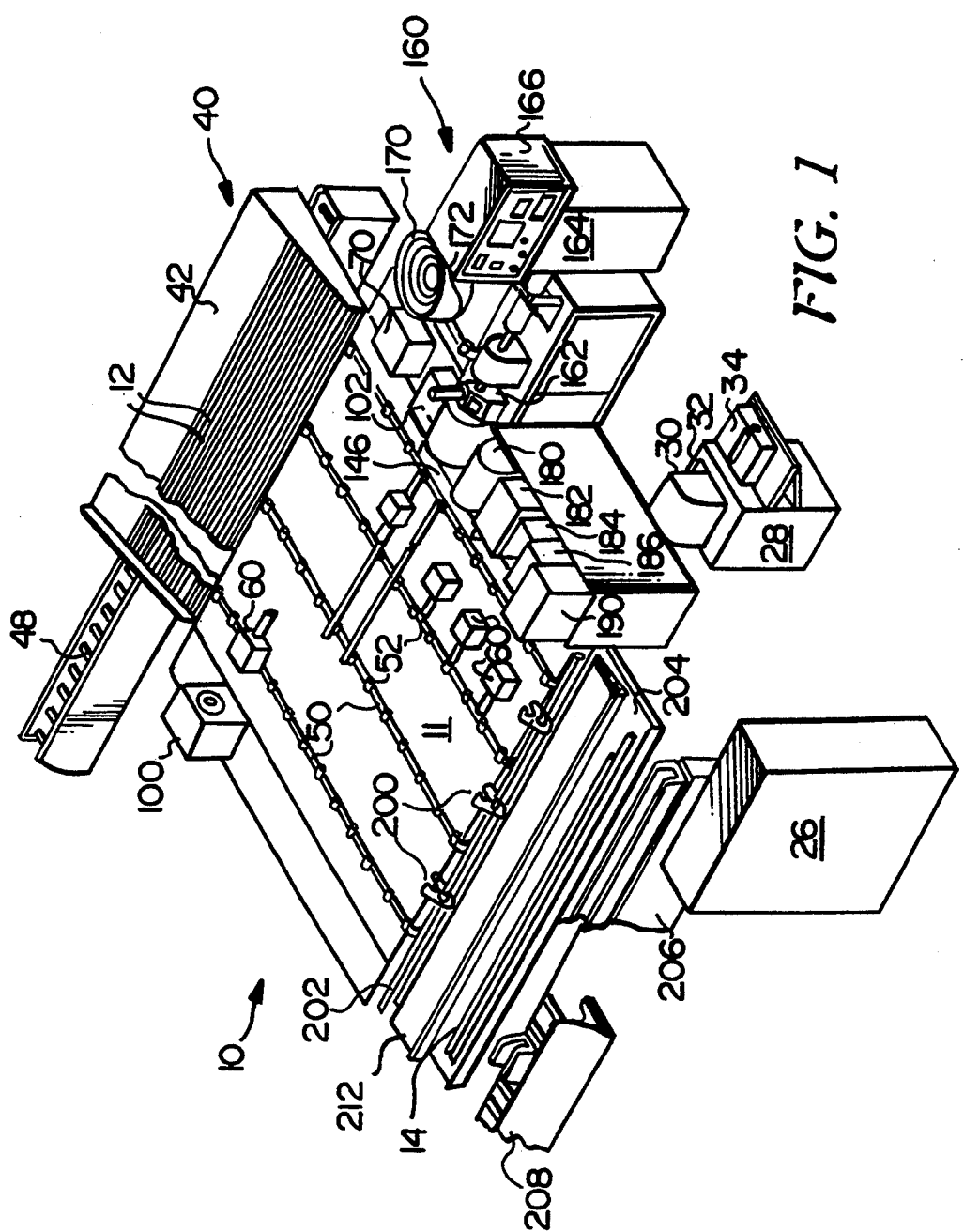
FIG. 1 depicts, in perspective, an embodiment in accordance with the present invention of an automated welding apparatus for welding a final end plug to an open end of a succession of nuclear fuel rod cladding tubes and for performing quality assurance inspection of the final end plug welds.
Figure 2:
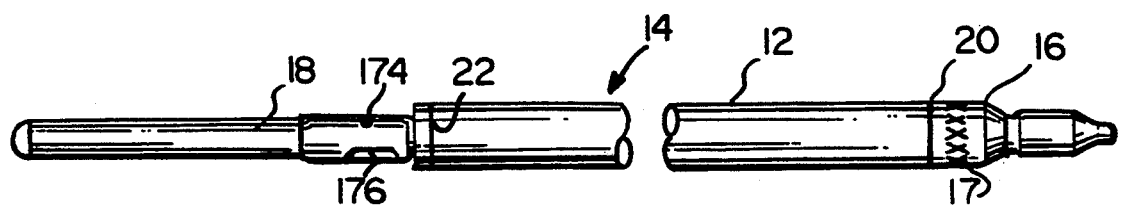
FIG. 2 is a side view of a nuclear fuel rod as output from the apparatus of FIG. 1.

The final weld apparatus of the present invention, generally indicated at 10 in FIG. 1, accepts, as inputs, cladding tubes 12, which have been sealed at one end by a first end plug and loaded with a column of fuel pellets through their other, open end, and outputs nuclear fuel rods 14 which have their cladding tube loading ends sealed by a final end plug. As seen in FIG. 2, a nuclear fuel rod 14 includes a cladding tube 12 having one end sealed by a first end plug 16 and the other end sealed by a final end plug 18. First end plug 16 is affixed to one cladding tube end by a continuous seam or girth weld 20, while final end plug 18 is affixed to the other cladding tube end by a continuous seam or girth weld 22.

Control of apparatus 10 is generally effected by a process controller 26, such as a General Electric Series Six Programmable Logic Controller (PLC). This process controller is linked with a computer system 28, which may include a data acquisition computer, such as a PDP 11/73 and a data analysis computer, such as a VAX Station II/GPX, both manufactured by Digital Equipment Corporation. The computer system is housed in a console which includes, inter alia, a CRT monitor 30, a keyboard 32 for selecting operating display modes, and a printer 34 for providing a hard copy record of operating parameters and inspection test results.

Still referring to FIG. 1, apparatus 10 includes an input queue 40 capable of holding a supply of cladding tubes 12 and a tube transporter 44 for indexing individual cladding tubes from the input queue to a succession of operating stations to be described. Input queue 40 includes an inclined feed table 42 on which a supply of cladding tubes is supported. The cladding tubes roll down on the feed table surface to a lower edge where they are picked up one-by-one by tube transporter 44. To assure reliable feeding of the cladding tubes to the transporter, suitable means (not shown) are provided to progressively increase the inclination of the feed table as the supply of the cladding tubes in the input queue diminishes. Input queue is served by a roller conveyor 48 on which trays (not shown) of cladding tubes are conveyed from a nuclear fuel pellet loading site. The cladding tubes are manually loaded onto feed table 42 preparatory to the automated welding and inspection operations performed by apparatus 10.

Figures 3, 4:
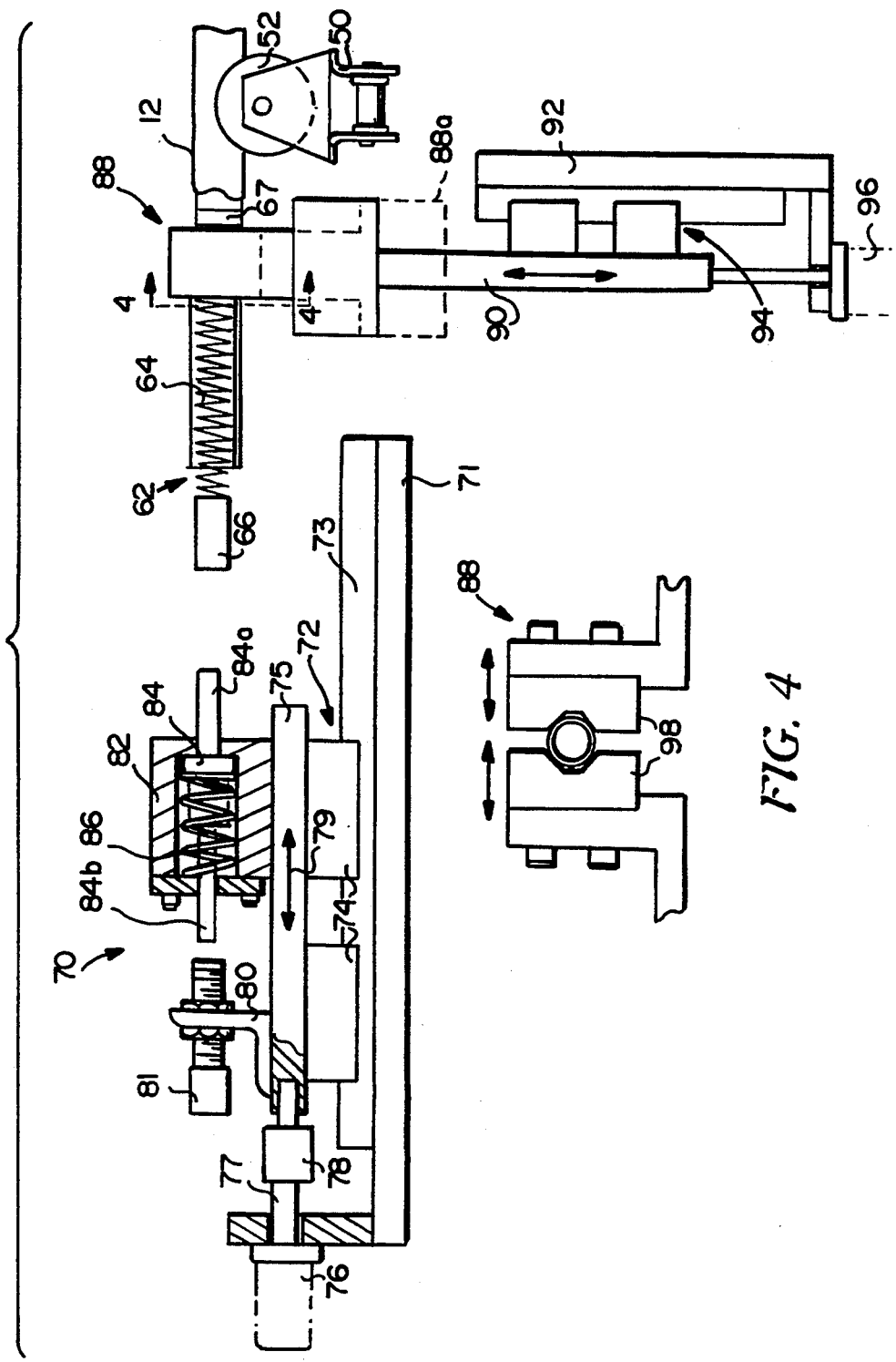
FIG. 3 is a side elevational view, partially broken away, of a plenum spring check station included in the apparatus of FIG. 1.
FIG. 4 is a view taken along line 4—4 of FIG. 3.

While the cladding tubes wait in the input queue, an operator manually checks for plenum length by inserting a depth gauge into the open loading end of each cladding tube to measure the distance from the last fuel pellet of the pellet column loaded into the cladding tube to the tube end and then inserts a plenum spring or a retainer into the tube open end. The latter version is generally indicated at 62 in FIG. 3 and includes a high spring constant compression spring 64 terminated at one end with a getter 66. The combination is inserted into each cladding tube to abut the spring free end against the face of the last pellet 67 in the pellet column. Since the compression spring 64 is in a relaxed state, the retainer end of the spring protrudes beyond the open end of the cladding tube, as illustrated in FIG. 3. When the final end plug is welded to the cladding tube open end, spring 64 is compressed between the final end plug and the pellet column (not shown), and thus exerts a force on the pellet column to promote intimate interfacial contact between the individual fuel pellets of the column.

Returning to FIG. 1, tube transporter 44 is preferably constructed in manner disclosed in the above-noted U.S. Pat. No. 4,857,260, the disclosure of which is expressly incorporated herein by reference. Thus, the transporter periodically picks up each cladding tube 12 as presented at the feed table lower edge and transports it successively from station to station. The transporter comprises a plurality of parallel, spaced conveyor chains 50 which are commonly driven in synchronous, indexing movement along respective closed loop paths. Each conveyor chain carries a plurality of correspondingly spaced grooved rollers 52 such as to provide a succession of equally spaced straight line tube supports transverse to the direction of the their indexing movements. To minimize scratching of the tube surfaces, these rollers are preferably formed of plastic. The uniform spacing between adjacent rollers 52 on each conveyor chain 50 is equal to the separation between the various operating stations to which each cladding tube is successively presented. Thus, each time the conveyor chains 50 index one position under the control of process controller 26, each tube, as supported in the roller grooves, is moved a distance equal to the spacing between the adjacent rollers and therefore from one station to the next. Each roller 52 is free to rotate about its axis which is aligned parallel to the direction of tube transport, thereby facilitating endwise or axial movement of the tubes into and out of the various operating stations. The number of conveyor chains utilized depends in part upon the degree of intermittent support needed to maintain the tubes in a substantially straight configuration with minimal sagging between rollers. Sensors (not shown) stationed at each index position signal process controller 26 that the tubes are properly supported by the transporter and are in proper positions for reciprocation into and out of the various operating stations.

Transporter 44 also includes a plurality of pinch wheel drives 60 operating to reciprocate the cladding tubes axially into and out of the various stations seen in FIG. 1. As disclosed in U.S. Pat. No. 4,857,260, the pinch wheel drives are positioned above the tube transporter at various index positions aligned with those operating stations into which tubes are to be reciprocated and include pinch wheels which move into driving engagements with the tubes thereat to concurrently propel the tubes into and out of their axially aligned operating stations.

The first of the succession of operating stations to which the cladding tubes are indexed is a spring check station, generally indicated at 70 in FIG. 1 and detailed in FIGS. 3 and 4. As seen in FIG. 3, spring check station 70 includes a base 71 for supporting a linear guide assembly indicated at 72 and comprised of a pair of parallel rails 73 each engaged by a pair of guide blocks 74 depending from a platform 75. An air cylinder 76, mounted by base 71, has its plunger 77 drivingly connected to platform 75 by a coupling 78. Upon actuation of air cylinder 76, platform 75, as supported by the linear guide assembly, is linearly stroked forwardly toward a detecting position and rearwardly to the illustrated standby position, as indicated by arrow 79 in FIG. 3.

Platform 75 supports, by way of a bracket 80, a proximity sensor 81 and a plunger block 82 in forwardly spaced relation to the sensor. Block 82 mounts a plunger 84 for fore and aft linear motion and a compression spring 86 biasing the plunger to the forward position illustrated in FIG. 3.

When a cladding tube 12 is indexed by transporter 44 into axial alignment with spring check station 70, a gripper head, generally indicated at 88 and affixed to a plate 90 supported from a base 92 by a linear guide assembly 94, is shifted upwardly from a retracted, phantom line position 88a to the illustrated solid line position 60 by an air cylinder 96, as seen in FIG. 3. A suitable gripper head is commercially available from PHD, Inc. of Fort Wayne, Ind. Jaws 98 (FIG. 4) are then closed into gripping engagement with cladding tube 12 to hold it in place on the tube transporter. Air cylinder 76 is then actuated to drive platform 75 forwardly to translate a forward pin extension 84a of plunger 84 into abutting engagement with retainer 66 at one end of the plenum spring/retainer combination. As platform 75 continues forwardly, plunger 84 is forced rearwardly relative to block 82 against the bias of spring 86 to close the gap with sensor 81. As a result, a rear pin extension 84b of the plunger moves into actuating proximity with sensor 81, which may be a conventional proximity switch. In response, the proximity sensor signals controller 26 that a plenum spring/retainer combination has indeed been inserted into the open end of the cladding tube and also signals the controller to deactuate air cylinder 76. The controller then retracts platform 75 and causes jaws 98 to open. Air cylinder 96 is then deactuated, and gripper head 88 is lowered to the retracted position, clearing the way for the next indexing step of the cladding tubes by the tube transporter.

If no plenum spring/retainer combination is found, the cladding tube is declared a reject by controller 26 and is indexed through the apparatus, but is not axially reciprocated into and out of the operating stations by the associated pinch wheel drives.

Returning to FIG. 1, with the next index step by transporter 44, each tube is moved from the spring check station 70 to a serial number reader station 100. As seen in FIG. 2, each first end plug 16 has imprinted thereon a unique serial number 17 that is read by a conventional optical character reader (not shown) when the first end plug end of each cladding tube is reciprocated into and back out of station 100 by an associated pinch wheel drive 60. The unique serial number provides an identifying reference for each cladding tube (fuel rod) and enables the creation of a traceable database for each tube as it progresses through apparatus 10. The serial number reader relays the serial number of each first end plug to data acquisition system 28 for storage and later retrieval. Once the particular serial number has been stored, subsequently acquired test data relating to that tube are correlated with that serial number for manufacturing and quality assurance record-keeping purposes. In addition, weld parameter data taken during the performance of each final end plug weld is held for correlation with the serial number of the involved cladding tube. Such weld parameter data includes weld current magnitude and duration, voltage, tube RPM, gas flow, etc. Maintaining a record of weld parameter data for each final end plug weld enables tracking the welding process and recognition of process excursions.

Figure 5:
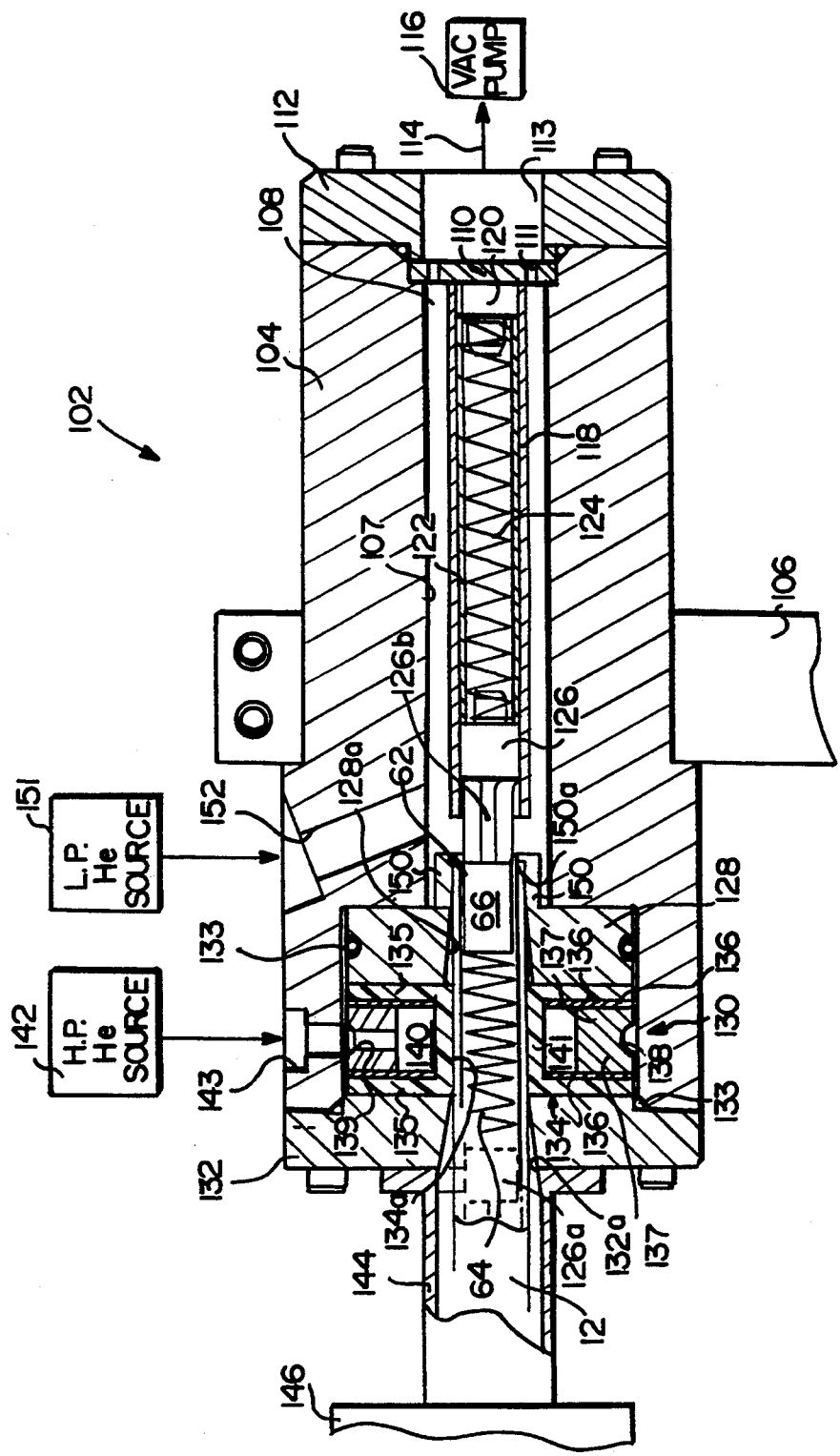
FIG. 5 is a longitudinal sectional view of an evacuation and low pressure backfill station utilized in the apparatus of FIG. 1.

The next in the succession of operating stations is, as seen in FIG. 1, an evacuation/low pressure backfill station 102. Turning to FIG. 5, this station comprises a housing 104 mounted by a bracket 106 in coaxial alignment with a cladding tube indexed to the evacuation/backfill station by the tube transporter. The housing has a central bore 107 which defines a cylindrical chamber 108 and whose illustrative right end is shouldered to seat a baffle 110 having a plurality of apertures 111. The baffle is secured in place by an end cap 112 having a central opening 113 for accepting a coupling and conduit, schematically indicated at 114, in fluid connection with a vacuum pump 116. An outer tube 118 is affixed at one end to baffle 110 for coaxial extension substantially through chamber 108. A shouldered plug 120 is positioned within tube 118 against baffle 110 and serves to axially position a close-fitting, coaxial inner tube 122 which serves to radially confine an elongated compression spring 124. The right end of this spring is anchored to fixed plug 120 and the left end thereof is anchored to a chaser plug 126 slidingly received in the left end portion of outer tube 118.

The left end of bore 107 is counterbored to accept an annular plate 128 and a fluid seal assembly, generally indicated at 130, which are clamped in place in the counterbore by an end cap 132. O-ring seals 133 prevent fluid leakage between the periphery of plate 128 and the housing counterbore and between the housing end and cap 132.

Still referring to FIG. 5, fluid seal assembly 130 includes a spool-shaped seal 134 formed of a suitable elastomeric material such as polyurethane. The exteriors of the radially extending sides 135 of seal 134 are backed by plate 128 and end cap 132 and the interiors thereof by metal washers 136 and an intervening metal ring 137. The peripheral surface of this ring is provided with an annular plenum groove 138 which communicates with a plurality of angularly spaced radial passages 139 opening into an annular cavity 140 defined between the inner circumferential surface of ring 137 and the cylindrical base 141 of seal 134. This cavity is in fluid communication with a high pressure source 142 of an inert gas, such as helium, via a housing port 143, annular plenum groove 138 and radial passages 139.

Affixed to end cap 132 is an extension tube 144 opening into a cooldown box 146, also seen in FIG. 1. This cooldown box may be constructed in the manner disclosed in the above-noted U.S. Pat. No. 4,857,260. Prior to axial insertion of a cladding tube into evacuation/backfill station 102, spring 124 is relaxed such that chaser plug 126 is extended through a central tapered bore 128a in plate 128, a central bore 134a in seal 134, and a tapered bore 132a in end cap 132 to a position proximate the right end of extension tube 144, as indicated in phantom at 126a.

When a cladding tube 12 is axially propelled by an associated pinch wheel drive through cool down box 146 and extension tube 144, chaser plug 126, in its phantom line extended position, is engaged by plenum spring retainer 66 protruding from the cladding tube open end. With continued axial movement of the cladding tube, chaser plug spring 124 compresses, causing the chaser plug to exert an opposing axial force on the retainer tending to coaxially orient the plenum spring/getter combination. The tapered bore of end cap 132 smoothly guides the end of the retainer and the end of the cladding tube into bore 134a of seal 134. As the cladding tube progresses under the guidance of tapered plate bore 128a toward to a tube end stop 150a carried by a rightwardly extending hub 150 integrally formed with plate 128, plenum spring 64 is compressed. When the cladding tube end abuts stop 150a, chaser plug 126 abuts a stop constituted by the left end of inner tube 122, at which point retainer 66 is positioned substantially flush with the tube end. The pinch wheel drive stalls out and is halted by the controller.

At this point, source 142 is connected with seal 130 to pressurize cavity 140 and radially press seal base 141 into sealing engagement with the exterior surface of cladding tube 12. Vacuum pump 116 is then activated to evacuate chamber 108 and the interior of the cladding tube. Preferably, the retainer engaging tip 126b of chaser plug 126 is notched so as not to block the evacuation and backfill of the cladding tube interior. When evacuation is complete, pump 116 is stopped, and a low pressure source 151 is connected to chamber 108 through a housing port 152 to backfill the cladding tube with helium gas to a pressure of one atmosphere. When backfilling is completed, sources 142 and 151 are closed off, and cavity 140 is vented, permitting base 141 of seal 134 to retract from sealing engagement with the cladding tube periphery. The pinch wheel drive is then activated to back the cladding tube out of the evacuation/backfill station 102 to a point where the open end of the cladding tube resides in cooldown box 146. Chaser plug 126 maintains orientation-controlling engagement with plenum spring retainer 66 as the cladding tube exits station 102 to ensure that the plenum spring/retainer assembly 62 remains fully inserted in the open end of the existing cladding tube.

With the open end of the cladding tube residing in cooldown box 146 after exiting the evacuation/backfill station 102, the integrity of the helium gas backfill in the cladding tube can be effectively maintained by flooding the cooldown box interior with helium.

With the next indexing step of tube transporter 44, a cladding tube is stepped to an index position axially aligned with a final end plug seam welding station, generally indicated at 160 in FIG. 1. This station includes a suitable welder 162, such as a TIG welder, with its associated power supply 164 and control panel 166. Located at the welding station is a supply of final end plugs 18 (FIG. 2) which are contained in a vibratory bowl feeder 170 and from which final end plugs are successively delivered along a track 172. Individual final end plugs are extracted from the track exit by a pick and place mechanism and mated to the open end of a cladding tube presented in the welding station. For representative structural details of this seam welding station, reference may be had to the above-noted U.S. Pat. No. 4,857,260. Since the weld chamber is flooded with helium, the helium backfill provided by station 102 is not disturbed. Once the seam weld 22 (FIG. 2) joining final end plug 18 to the end of cladding tube 12 is completed, the cladding tube is backed out of the welding station by a pinch wheel drive, again only to the point where the final end plug end of the tube remains in cooldown box 146.

The final end plug end of each cladding tube remains in cool down box 146 for two indexing steps of tube transporter 44 which brings them successively into axial alignment with a high pressure welding station, generally indicated at 180 in FIG. 1. While in the cooldown box, the final end plug seam weld is cooled in a helium atmosphere to a temperature below that at which the weld and adjacent tube and end plug material readily oxidizes. Since most cladding tubes and final end plugs are made of Zircaloy, cooling the welded end portion of the tube to a temperature below 40° C. should be sufficient to prevent discoloring oxidation of the welded parts.

Referring again back to FIG. 2, each final end plug 18 includes a pressurization hole 174 drilled radially through to an open end plug interior which is in communication with the cladding tube interior. Since welding station 160 only effected seam weld 22 joining the final end plug to the cladding tube open end, pressurization hole 174 must be closed off in high pressure weld station 180. In order to locate pressurization hole 174 and thus effect its closure, and the final end plug 18 is provided with a keyway 176 in known annularly spaced relation to the pressurization hole. Thus, when the final end plug end of a cladding tube is propelled axially into the high pressure welding station by an associated pinch wheel drive, the cladding tube is stopped at a predetermined axial position and then rotated until a suitable key (not shown) catches in keyway 176, thus to locate pressurization hole 174 in an appropriate welding position relative to the torch and electrode of a TIG welder. Once the final end plug end of the cladding tube is properly positioned within the high pressure weld box, a seal assembly such as disclosed at 130 in FIG. 5 is pressurized to seal off the penetration of the cladding tube. The weld box is then pressurized to a specified high helium pressure, e.g., three to twenty atmospheres, as is the interior of the cladding tube through the open pressurization hole. Once pressurization is complete, the pressurization hole is welded closed. After this seal weld has cooled, the weld box is depressurized, the tube entry seal is released, and the associated pinch wheel drive draws a completed fuel rod out of the high pressure seal weld station and fully onto transporter 44.

The next in the succession of operating stations is a leak detection station 182 to which the cladding tubes, which now may be considered nuclear fuel rods 14, are indexed from the high pressure seal weld station. When presented at the leak detection station, each fuel rod is propelled axially into a chamber and its chamber entry is sealed by pressurization of an entry seal constructed in the same fashion as entry seal 130 in FIG. 5. Air is pulled through a chamber port to pick up any helium leaking from the nuclear fuel rod and conveyed through a conduit to a conventional helium gas detector. If helium gas is detected, computer system 28 is notified. Upon completion of the helium leak test, the entry seal is depressurized and the fuel rod 14 is backed out onto the transporter 44 by an associated pinch wheel drive.

From the leak detection station, each rod is next indexed to a parallelism gauge station 184 which may be equipped to operate in the manner disclosed in the above cited U.S. Pat. No. 4,857,260. Thus, an associated pinch wheel drive propels the final end plug end of the nuclear fuel rod into the parallelism gauge station where it is halted at a predetermined axial reference position and, as disclosed in the referenced patent, a pair of gauge fixtures oriented 90° apart are pivoted into contact with the final end plug peripheral surface and their contacting positions are sensed to accurately calculate the extent of any non-parallelism or non-concentricity between the fuel rod axis and the final end plug axis.

Once back out of the parallelism gauge station, a fuel rod is indexed to the next station, a ring gauge station indicated at 186 in FIG. 1. Here again, the ring gauge station may be equipped in the manner taught in U.S. Pat. No. 4,857,260. Thus, station 186 may be equipped with a ring gauge (not shown) which is positioned in the path of axial motion of the fuel rod into the station. If the diameter of seam weld 22 (FIG. 2) joining the final end plug 18 to cladding tube 12 is less than a specified maximum diameter, as established by the ring gauge, the end plug end of the nuclear fuel rod passes freely through the ring gauge. This event is sensed, and computer system 28 is duly notified. If the end plug weld exceeds the specified maximum diameter, the final end plug end of the fuel rod will not pass through the ring gauge. This event will also be recognized by the sensors, and the computer system will be so notified.

The last of the final end plug weld inspection stations is an ultrasonic (UT) inspection station, indicated at 190 in FIG. 1. This inspection station may also be constructed in the manner disclosed in U.S. Pat. No. 4,857,260. However, since the nuclear fuel rod contains a full load of fuel pellets, it is preferable that ultrasonic scanning of the final end plug weld not entail rotation of the fuel rod, as was the case for the empty cladding tube in the referenced patent. Thus, in UT inspection station 200, ultrasonic scanning is preferably accomplished by revolving one or more ultrasonic transducers in a fixed orbit about the final end plug weld as the nuclear fuel rod is periodically axially incremented to achieve a spiral ultrasonic scan pattern of the cross-sections of the final end plug weld and adjacent portions of the cladding tube and final end plug. The echoes received from the probing ultrasonic energy are transmitted to the data acquisition computer and processed to develop test data indicative of weld integrity, weld dimensions, tube wall thickness proximate the weld, and the welded position of the final end plug in the tube end. This test data is compared against established standards to ultimately determine whether the final end plug weld is acceptable or not. These test results, together with the test results from the leak detection, parallelism and ring gauging stations, are correlated with the previously entered serial number of the first end plug uniquely identifying each nuclear fuel rod and printed out by a printer 34. The test results may also be displayed on an essentially real time basis by monitor 30.

The fuel rods then successively arrive at the final operating station, a sorting station, which may also be equipped in the manner disclosed in U.S. Pat. No. 4,857,260. Thus as illustrated in FIG. 1 herein, the sorting station includes plurality of sorter hands 200 which are affixed to a shaft 202 in appropriately spaced relation. Controller 26, in response to signals from computer system 28, selectively, angularly positions these hands such that, upon the next transporter indexing step, an accepted fuel rod that has passed all of the established quality control standards is placed in an output queue 204 where it is accumulated with other accepted fuel rods for ultimate loading into a fuel rod tray 206 located in a convenient loading position on a tray conveyor 208. On the other hand, if the final end plug weld of a particular fuel rod fails any of the inspections performed by the various inspection stations, the fuel rod in question is picked up by the sorter hands and placed on a reject tray 212 where it can be visually inspected by an operator and eventually taken to another site where rejected fuel rods can be opened to reclaim the fuel pellets.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. Automated apparatus for welding a separate final end plug to an open end of each a succession of nuclear fuel-loaded cladding tubes and for inspecting each final end plug of weld, said apparatus comprising, in combination:

a spring check station including a probe mounted for movement into detecting relation with a plenum spring residing in the open end of each cladding tube and a sensor for detecting a motion of said probe verifying the presence of a plenum spring;

a reader station for reading a unique serial number imprinted on a first end plug welded to an end of each cladding tube opposite the open end;

a welding station for welding a final end plug to the open end of each cladding tube;

at least one inspection station for inspecting each final end plug weld and for generating weld inspection data;

data acquisition means linked with said reader station and said inspection station and operating to correlate the weld inspection data with the associated first end plug serial number for each final end plug weld;

an input queue for holding a plurality of cladding tubes; and a tube transporter operating to periodically pick individual cladding tubes from said input queue for conveyance to said spring check, reader, welding and inspection stations.

2. The apparatus defined in claim 1, wherein said tube transporter conveys said tube in a direction transverse to their tube access in indexing steps to index positions respectively axially aligned with such stations, said transporter further including separate drive means positioned at selected said index positions for axially reciprocating said tubes into and out of said stations.

3. The apparatus defined in claim 2, wherein said spring check station further includes a tube gripper mounted for vertical movement between a gripping position and a retracting position in non-interfering relation with the indexing step conveyance of said cladding tubes by said tube transporter, said gripper, in said gripping position, gripping a cladding tube axially aligned with said spring check station to prevent axial motion of said cladding tube in response to probing movement of said probe.

4. The apparatus defined in claim 3, wherein said probe is in the form of a forwardly spring-biased plunger mounted for forward and rearward reciprocating motion in coaxial relation to the open end of said cladding tube gripped by said gripper, said spring check station further including means for reciprocating said plunger, said sensor mounted for reciprocating movement with said plunger and positioned rearwardly of said plunger in gapped relation, whereby said sensor responds to closure of the gapped relation between said plunger and said sensor caused by engagement of a plenum spring by said plunger doing forward movement to provide verification of the presence of a plenum spring.

5. The apparatus defined in claim 4, which further comprises a controller responsive to said sensor for inhibiting reciprocation into and out of such stations by said drive means of a cladding tube lacking a plenum spring in the tube open end.

6. The apparatus defined in claim 2, which further includes an evacuation/backfill station to which each cladding tube is indexed prior to said welding station, said evacuation/backfill station including a housing having an entry through which each cladding tube is reciprocated by said drive means to position the open end thereof in said housing, said housing entry incorporating a fluid seal for expanding into sealing engagement with the cladding tube to prevent fluid leakage past said housing entry, a vacuum pump for evacuating said housing and the cladding tube interior, and a source of inert gas connectable with said housing to backfill the tube interior with the inert gas to a pressure of at least one atmosphere.

7. The apparatus defined in claim 6, wherein said evacuation/backfill station further includes a spring-biased element for engaging a portion of a plenum spring protruding from the tube open end to controllably axially orient the protruding spring portion such as to promote smooth entry and egress of the protruding spring portion through said housing entry.

8. The apparatus defined in claim 7, wherein said entry seal includes a spool-shaped elastomeric material having a pair of axially spaced sides radially extending from a cylindrical base, said base having a bore through which a cladding tube extends to position the tube open end in said housing, and a ring-shaped rigid member position between said sides to define with said base an annular chamber, said ring-shaped member having at least one passage through which a high pressure fluid is introduced into said cavity to expand said base into sealing engagement with the cladding tube.

9. Automated apparatus for welding a separate final end plug to an open end of each of a succession of nuclear fuel-loaded cladding tubes and for inspecting each final end plug weld, said apparatus comprising, in combination:

an evacuation/backfill station for backfilling each cladding tube with an inert gas to a pressure of at least one atmosphere;

a reader station for reading a unique serial number imprinted on a first end plug welded to an end of each cladding tube opposite the open end;

a first welding station for effecting a seam weld to affix a final end plug to the open end of each cladding tube in an inert gas atmosphere;

a second welding station operating to pressurize an interior of each cladding tube with an inert gas through a pressurization hole in the final end plug and then to weld the pressurization hole closed;

an inspection station for inspecting each final end plug weld and for generating weld inspection data;

data acquisition means linked with said reader station and said inspection station and operating to correlate the weld inspection data with the associated first end plug serial number for each final end plug weld;

an input queue for holding a plurality of cladding tubes; and a tube transporter operating to periodically pick individual cladding tubes from said input queue for conveyance to said evacuation/backfill station, said reader station, said first and second welding stations and said inspection station.

10. The apparatus defined in claim 9, wherein said tube transporter conveys said tubes in a direction transverse to their tube axis in indexing steps to index positions respectively, axially aligned with said stations, said transporter further including separate drive means positioned at selected said index positions for axially reciprocating said tubes into and out of said stations.

11. The apparatus defined in claim 10, wherein said evacuation/backfill station includes a housing having an entry through which each cladding tube is reciprocated by said drive means to position the open end thereof in said housing, said housing entry including a fluid seal for expanding into sealing engagement with the cladding tube to prevent fluid leakage past said housing entry, a vacuum pump for evacuating said housing and the cladding interior, and a source of inert gas connectable with said housing to backfill the tube interior with inert gas to a pressure of at least one atmosphere.

12. The apparatus defined in claim 11, which further includes a spring check station including a probe mounted for movement into detecting relation with a plenum spring residing in the open end of each cladding tube and a sensor for detecting a motion of said probe verifying the presence of a plenum spring.

13. The apparatus defined in claim 12, wherein said evacuation/backfill station further includes a spring biased element for engaging a portion of the plenum spring protruding from the tube open end to controllably axially orient the spring protruding portion such as to promote smooth transition of the protruding spring portion through said housing entry.

14. The apparatus defined in claim 13, wherein said entry seal includes a spool-shaped elastomeric material member having a pair of axially spaced sides radially extending from a cylindrical base, said base having a bore through which the cladding tube extends to position the tube open end in said housing, and a ring-shaped rigid member positioned between said sides to define with said base an annular cavity, said ring-shaped member having at least one passage through which a high pressure fluid is introduced into said cavity to expand said base into sealing engagement with the cladding tube.

15. The apparatus defined in claim 14, wherein said spring check station further includes a tube gripper mounted for vertical movement between a gripping position and a retracted position in non-interfering relation with the indexing step conveyance of the cladding tubes on said tube transporter, said gripper, in said gripping position, gripping a cladding tube axially aligned with said spring check station to prevent axial motion of the cladding tube in response to probing movement of said probe.

16. The apparatus defined in claim 15, wherein said probe is in the form of a forwardly spring-bias plunger mounted for reciprocating movement in coaxial relation to the open end of the cladding tube gripped by said gripper, said spring check station further including means for reciprocating said plunger, said sensor mounted for reciprocating a movement with said plunger and positioned rearwardly of said plunger in gapped relation, whereby said sensor responds to closure of the gapped relation caused by engagement of a plenum spring by said plunger during forward plunger movement to provide verification of the presence of the plenum spring.

17. The apparatus defined in claim 16, which further comprises a controller responsive to said sensor for inhibiting reciprocation into and out of said stations by said drive means of a cladding tube lacking a plenum spring in the open tube end.

* * * * *